(12) United States Patent
Lv et al.

(10) Patent No.: US 12,305,490 B1
(45) Date of Patent: May 20, 2025

(54) METHOD OF NANO-ARMORED FOAM REINFORCED GEOLOGICAL STORAGE OF CARBON DIOXIDE

(71) Applicant: China University of Petroleum—Beijing, Beijing (CN)

(72) Inventors: Qichao Lv, Beijing (CN); Tongke Zhou, Beijing (CN); Juan Zhang, Beijing (CN); Ya Zhao, Beijing (CN); Honglei Zhan, Beijing (CN); Rong Zheng, Beijing (CN); Abdolhossein Hemmati-Sarapardeh, Beijing (CN); Mehdi Ostadhassan, Beijing (CN); Zhaoxia Dong, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 0 days.

(21) Appl. No.: 18/657,296

(22) Filed: May 7, 2024

(30) Foreign Application Priority Data

Jan. 25, 2024 (CN) .......................... 202410108178.1

(51) Int. Cl.
*E21B 41/00* (2006.01)
*C09K 8/42* (2006.01)

(52) U.S. Cl.
CPC .......... *E21B 41/0064* (2013.01); *C09K 8/426* (2013.01); *C09K 2208/08* (2013.01); *C09K 2208/10* (2013.01)

(58) Field of Classification Search
CPC . E21B 41/0064; C09K 8/426; C09K 2208/08; C09K 2208/10

(Continued)

(56) References Cited

U.S. PATENT DOCUMENTS

| 11,236,265 | B2* | 2/2022 | Jin .......................... C09K 8/665 |
| 2023/0062001 | A1 | 3/2023 | Almajid et al. |
| 2023/0064753 | A1* | 3/2023 | Ayirala .................. E21B 43/164 |

FOREIGN PATENT DOCUMENTS

| AR | 105070 A1 | 9/2017 |
| CN | 101190743 B | 11/2013 |

(Continued)

OTHER PUBLICATIONS

The State Intellectual Property Office of People's Republic of China, "First Office Action" in Application No. 202410108178.1, Jul. 26, 2024, 13 pages.

*Primary Examiner* — Silvana C Runyan
(74) *Attorney, Agent, or Firm* — Davis Wright Tremaine LLP

(57) ABSTRACT

The present disclosure provides a method of nano-armored foam reinforced geological storage of carbon dioxide. A pre-$CO_2$ slug, a surfactant foam slug, a nanoparticle-enhanced foaming liquid slug and a post-$CO_2$ slug are injected successively into a geological storage formation, where the post-$CO_2$ slug is injected multiple times in equal portions, and a well soaking is performed after each injection. A nanoparticle-enhanced foaming liquid is made by using nanoparticles of different dimensions or using nanoparticles of multiple dimensions at the same time based on the reservoir characteristics. During the process of well soaking, a supercritical $CO_2$ and the nanoparticle-enhanced foaming liquid in the formation can in situ generate single-dimensional or composite-dimensional nano-armor reinforced $CO_2$ foam underground, which can plug channeling path and expand the $CO_2$ storage range, and make respective slugs cooperate with each other, thereby enlarging a geological storage amount of $CO_2$.

20 Claims, 5 Drawing Sheets

(58) Field of Classification Search
USPC .......................................................... 166/402
See application file for complete search history.

(56) References Cited

FOREIGN PATENT DOCUMENTS

| CN | 114687714 A | | 7/2022 | |
|---|---|---|---|---|
| CN | 114735701 A | | 7/2022 | |
| CN | 115788577 A | | 3/2023 | |
| CN | 116376014 A | * | 7/2023 | ............. C01B 32/50 |
| CN | 116696473 A | | 9/2023 | |

* cited by examiner

METHOD OF NANO-ARMORED FOAM REINFORCED GEOLOGICAL STORAGE OF CARBON DIOXIDE

CROSS-REFERENCE TO RELATED APPLICATION

This application claims priority to Chinese Patent Application No. 202410108178.1, filed on Jan. 25, 2024, which is hereby incorporated by reference in its entirety.

TECHNICAL FIELD

The present disclosure belongs to the technical field of carbon storage and utilization, and relates to a method of nano-armored foam reinforced geological storage of carbon dioxide.

BACKGROUND

The excessive emission of greenhouse gases such as $CO_2$ is one of main reasons for the current drastic climate change and global temperature rise. It is one of important methods for reducing atmospheric carbon concentration to inject $CO_2$ into the formation through carbon capture, utilization, and storage (CCUS) technology to achieve long-term geological storage, where, underground saline layer and abandoned oil-gas reservoir are both ideal carbon storage spaces. However, due to a larger viscosity and density difference between $CO_2$ and liquid such as water and oil, an injected $CO_2$ is easy for channeling along the high permeability zone, and the storage amount is greatly reduced. Moreover, the state of $CO_2$ under the formation conditions is mostly supercritical, its flow state is more unstable, and the security of storage cannot be guaranteed. Therefore, how to improve the geological storage capacity of $CO_2$ is the key problem to be solved urgently.

At present, one of common methods to improve the geological storage capacity of $CO_2$ is to capture $CO_2$ as a dispersed phase in a bubble to form a foam, and inject the foam into the formation for storage, which can improve the flow resistance and block off the preferential channel, so as to achieve the purposes of expanding the sweep range, reducing the leakage of $CO_2$, and improving the storage amount and storage security of $CO_2$. However, the foam itself is a thermodynamically unstable system, and the state of supercritical $CO_2$ is even more unstable. The foam will spontaneously burst and eventually disappear over time. To improve the stability of foam, the viscosity of the foaming liquid should be increased. When the foam is to be in situ generated underground, it is difficult to generate the foam underground since the viscosity of foaming liquid is too high. When the foam is to be generated through ground foaming, it is difficult for foam injection since the required injection pressure is very high. In order to reduce the difficulty of injection, the viscosity of foaming liquid can only be reduced, which will lead to instability of the foam and poor plugging effect, resulting in small $CO_2$ storage amount, easiness for leakage, and reduced geological storage rate of $CO_2$. In addition, due to large difference in characteristics such as porosity and permeability among reservoirs, there are compatibility problems between foams and reservoirs. Therefore, it is urgent to develop a geological storage method of carbon dioxide with high geological storage rate and suitability for different storage reservoirs.

SUMMARY

The present disclosure provides a method of nano-armored foam reinforced geological storage of carbon dioxide, which can significantly improve the geological storage amount of carbon dioxide.

The present disclosure provides a method of nano-armored foam reinforced geological storage of carbon dioxide, including following steps:

1) injecting a pre-$CO_2$ slug into a geological storage formation, after an injection pressure of the pre-$CO_2$ slug shows a peak value, proceeding with an injection of the pre-$CO_2$ slug until the injection pressure is reduced to ½-⅔ of maximum pressure, stopping the injection of the pre-$CO_2$ slug, and then injecting a surfactant foam slug;

2) after completing the injection of the surfactant foam slug, injecting a nanoparticle-enhanced foaming liquid slug and a post-$CO_2$ slug successively, where the post-$CO_2$ slug is injected multiple times in equal portions, and a well soaking is performed after completing each injection;

a ratio of each injection amount of the post-$CO_2$ slug to an injection amount of the nano-fluid foaming liquid slug is 1:(2-3);

the surfactant foam slug includes a gas phase and a liquid phase; the gas phase includes $CO_2$ and the liquid phase includes 0.1-2.0 wt % of a first foaming agent and water in balance, based on a mass percentage content; a foam quality of the surfactant foam slug is 50-80%;

the nano-fluid foaming liquid slug includes: 0.1-2.0 wt % of a second foaming agent, 0.05-1.0 wt % of nanoparticles, 0.01-0.05 wt % of a pH regulator, 0.1-2.0 wt % of a particle solubilizer, and the balance of water, based on a mass percentage content.

Further, a ratio of an injection amount of the surfactant foam slug to an injection amount of the pre-$CO_2$ slug is 1:(8-10);

a ratio of a total injection amount of the nanoparticle-enhanced foaming liquid slug and the post-$CO_2$ slug to the injection amount of the surfactant foam slug is (2-4):1;

a ratio of an injection amount of the post-$CO_2$ slug to the injection amount of the nanoparticle-enhanced foaming liquid slug is (1-4):1.

Further, when a total injection amount of the pre-$CO_2$ slug and the post-$CO_2$ slug is less than a theoretical injection amount of $CO_2$, a step 2) is performed in a circular manner.

Further, the well soaking has a duration of 1 to 7 days.

Further, the nanoparticle includes at least one of zero-dimensional nanoparticle, one-dimensional linear nanofiber, two-dimensional sheet-like nanosheet, and three-dimensional aerogel nanomaterial.

Further, the zero-dimensional nanoparticle includes at least one of alumina, silica and ferroferric oxide;

a wetting angle of the zero-dimensional nanoparticle to water is 103-129°, and a median particle diameter of the zero-dimensional nanoparticle is 4-30 nm.

Further, the one-dimensional linear nanofiber includes at least one of cellulose nanofiber, cellulose nanocrystal, and nano-chitin;

a section diameter of the cellulose nanofiber is 4-18 nm, and a length of the one-dimensional linear nanofiber is 10-60 μm.

Further, the two-dimensional sheet-like nanosheet includes at least one of inorganic Janus nanosheet and organic Janus nanosheet;

the organic Janus nanosheet has a thickness of 5-40 nm and a wetting modification capacity of 60-85°.

Further, the three-dimensional aerogel nanomaterial includes at least one of silica aerogel nanomaterial and alumina aerogel nanomaterial;

the silica aerogel nanoparticle has a specific surface area of 500-900 $m^2/g$, a density of 0.2-0.4 $g/cm^3$, a median particle diameter of 10-30 nm, a porosity of 85-95%, and a wetting angle of a particle surface relative to water is 105-131°.

Further, the geological storage formation is a saline layer, and a mass ratio between the second foaming agent and the nanoparticle in the nanoparticle-enhanced foaming liquid slug is 3-6; or the geological storage formation is an oil-bearing layer and a mass ratio between the second foaming agent and the nanoparticle in the nanoparticle-enhanced foaming liquid slug is 2-4.

In the method of nano-armored foam reinforced geological storage of carbon dioxide of the present disclosure, by injecting multiple slugs, respective slugs can cooperate and influence with each other, thereby improving the geological storage amount of carbon dioxide. Where, the surfactant foam slug can not only make the subsequently-injected nanoparticle-enhanced foaming liquid slug flow to a non-channeling path and expand its sweep range, but also help the nanoparticle-enhanced foaming liquid and the subsequently-injected post-$CO_2$ slug to form a foam with a higher strength, thereby improving the plugging effect. At the same time, due to a low viscosity of the nanoparticle-enhanced foaming liquid slug, by injecting the nanoparticle-enhanced foaming liquid slug and the post-$CO_2$ slug respectively, the nano-armored foam with a higher strength can be generated in situ underground, thereby reducing the difficulty of injection and expanding the sweep range. The post-$CO_2$ slug is injected multiple times, and one part of the post-$CO_2$ is mixed with the nanoparticle-enhanced foaming liquid to generate the nano-armored foam in situ underground, and the other part of $CO_2$ flows toward the unswept formation, thereby further expanding the sweep range. For different reservoir conditions, using nanoparticles of different dimensions to prepare the nanoparticle-enhanced foaming liquid to generate the nano-armored foam can not only improve the storage effectiveness of carbon dioxide, but also control the storage cost. Through the cooperation of the above respective slugs, the geological storage amount of $CO_2$ can be significantly improved.

DESCRIPTION OF REFERENCE NUMBERS

101—pre-$CO_2$ slug;
102—surfactant foam slug;
103—nanoparticle-enhanced foaming liquid slug;
104—post-$CO_2$ slug;
201—nano-armored foam.

DESCRIPTION OF EMBODIMENTS

To make the purpose, technical solution and advantages of the present disclosure clearer, the following clearly and comprehensively describes the technical solutions in embodiments of the present disclosure with reference to the embodiments of the present disclosure. Apparently, the described embodiments are merely a part rather than all of embodiments of the present disclosure. All other embodiments obtained by persons of ordinary skill in the art based on embodiments of the present disclosure without paying creative effort shall fall within the protection scope of the present disclosure.

Figure 1:
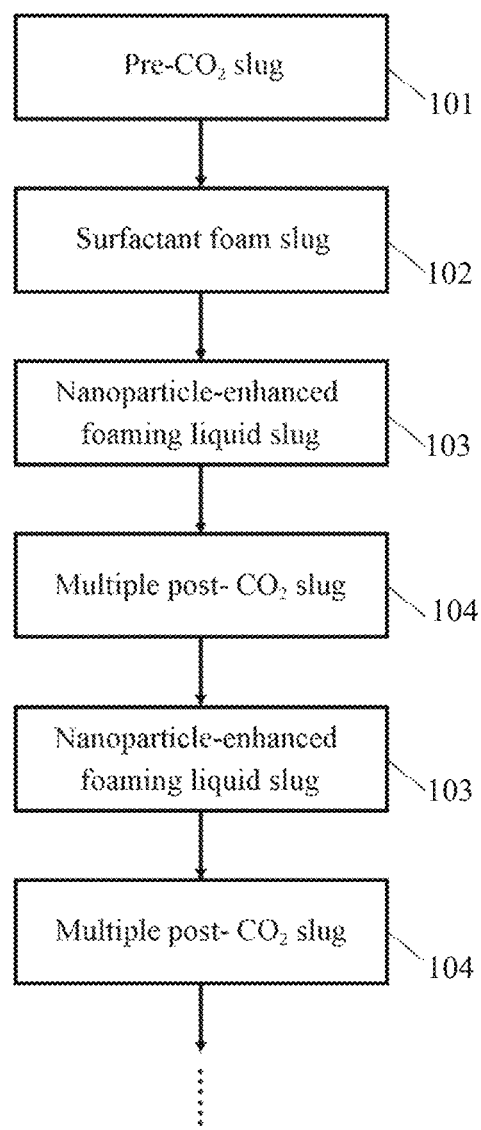
FIG. 1 is a flowchart of carbon dioxide geological storage of the present disclosure.

The present disclosure provides a method of nano-armored foam reinforced geological storage of carbon dioxide, as shown in FIG. 1, including following steps:

1) injecting a pre-$CO_2$ slug 101 into a geological storage formation, after an injection pressure of the pre-$CO_2$ slug 101 shows a peak value, proceeding with the injection of the pre-$CO_2$ slug 101 until the injection pressure is reduced to ½-⅔ of maximum pressure, stopping the injection of the pre-$CO_2$ slug 101, and then injecting a surfactant foam slug 102;

2) after completing the injection of the surfactant foam slug 102, successively injecting a nanoparticle-enhanced foaming liquid slug 103 and a post-$CO_2$ slug 104, where the post-$CO_2$ slug 104 is injected multiple times in equal portions and a well soaking is performed after each injection of the post-$CO_2$ slug 104 is completed;

the ratio of each injection amount of the post-$CO_2$ slug 104 to an injection amount of the nanoparticle-enhanced foaming liquid slug 103 is 1:(2-3);

the surfactant foam slug 102 includes a gas phase and a liquid phase, where the gas phase includes $CO_2$, the liquid phase includes 0.1-2.0 wt % of a first foaming agent and water in balance based on a mass percentage content, and a foam quality of the surfactant foam slug is 50-80%;

the nanoparticle-enhanced foaming liquid slug 103 includes: 0.1-2.0 wt % of a second foaming agent, 0.05-1.0 wt % of a nanoparticle, 0.01-0.05 wt % of a pH regulator, 0.1-2.0 wt % of a particle solubilizer, and water in balance, based on a mass percentage content.

Specifically, in step (1), the pre-$CO_2$ slug 101 is injected into the geological storage formation. In the injection process, the injection pressure is monitored in real time, a maximum injection pressure in the injection process is obtained according to a change trend of injection pressure over time, and the injection is continued. When the injection pressure is reduced to ½ to ⅔ of the maximum injection pressure, the injection of the pre-$CO_2$ slug 101 is stopped. Then, the surfactant foam slug 102 is injected to plug a channeling path, where the surfactant foam slug 102 includes the gas phase and the liquid phase. The gas phase includes $CO_2$; and based on the mass percentage content, the liquid phase includes 0.1-2.0 wt % of the first foaming agent and the balance of water. The foam quality of the surfactant foam slug is 50-80%.

The surfactant foam slug 102 in the present disclosure is generated by a manner of ground surface foaming. For example, 0.1 wt % to 2.0 wt % of the first foaming agent and the water may be conveyed to a foam generator to generate the surfactant foam slug 102 having a foam quality of 50% to 80%.

The foam quality in the present disclosure refers to a percentage of a volume of gas in the foam to a total volume of the foam.

The first foaming agent is not specifically limited in the present disclosure. Exemplarily, it includes at least one of anionic surfactant, cationic surfactant and non-ionic surfactant; and preferably, at least one of *camellia* saponin, alkyl glycoside and trehalose glycolipid may be used.

The present disclosure does not specifically limit a source of the first foaming agent; and the commercially available product known to the skilled person in the art or the product prepared by a conventional preparation method may be used.

In step (2), after the injection of the above surfactant foam slug 102 is completed, the nanoparticle-enhanced foaming liquid slug 103 and the post-$CO_2$ slug 104 are injected successively, where, the post-$CO_2$ slug 104 is injected multiple times in equal portions, and a ratio of each injection amount of the post-$CO_2$ slug 104 to an injection amount of the nanoparticle-enhanced foaming liquid slug 103 is 1:(2-3), and the well-soaking is performed after completing each injection. Where, based on a mass percentage content, the nanoparticle-enhanced foaming liquid slug 103 includes 0.1-2.0 wt % of the second foaming agent, 0.05-1.0 wt % of the nanoparticle, 0.01-0.05 wt % of a pH regulator, 0.1-2.0 wt % of the particle solubilizer, and the balance of water. In the above process of the injection of post-$CO_2$ slug 104 and the well-soaking, because a flow rate of $CO_2$ is faster than that of the nanoparticle-enhanced foaming liquid, the $CO_2$ that is injected firstly will flow forward and mix with the nanoparticle-enhanced foaming liquid to generate a nano-armored foam in situ, plugging the high permeability channel. When enough foam is generated, the $CO_2$ that is injected later will flow to the unswept formation on the premise that the high permeability channel is plugged.

A ratios of injection amounts of slugs in the present disclosure are each a volume ratio under the condition of actual temperature and pressure of formation.

The second foaming agent in the present disclosure is the same as the above limitation, and will not be repeated here.

The present disclosure does not specifically limit the pH regulator and the particle solubilizer. For example, the pH regulator includes at least one of sodium carbonate, potassium carbonate and sodium bicarbonate; and the particle solubilizer includes at least one of ethanol, isopropyl alcohol, and ethylene glycol.

The present disclosure does not specifically limit a source of the pH regulator and particle solubilizer, and the commercially available product known to the skilled in the art or the product prepared by a conventional preparation method may be used.

In the nano-armored foam reinforced geological storage method of carbon dioxide of the present disclosure, the pre-$CO_2$ slug 101 is firstly injected into the geological storage formation to perform $CO_2$ storage. In this process, a channeling path will be formed. When the injection pressure is reduced to ½-⅔ of the maximum injection pressure, the surfactant foam slug 102 is injected to plug the channeling path, thereby preventing the nanoparticle-enhanced foaming liquid slug 103 injected subsequently from flowing away from the channeling path. Making the nanoparticle-enhanced foaming liquid slug 103 flow to channels next to the channeling path, can not only reduce the waste of the nanoparticle-enhanced foaming liquid slug 103, but also expand the sweep range and then expand the geological storage amount of $CO_2$. Furthermore, the surfactant slug 102 will first adsorb on the surface of rock in the formation in a process of flowing in the formation, which can avoid the adsorption of nanoparticles in the nanoparticle-enhanced foaming liquid slug 103 injected subsequently on the surface of rock in the formation, resulting in the inability of the nano-fluid foam to form the nano-armored foam having higher strength with the post-$CO_2$ slug 104 injected later, thereby improving the plugging effect, and expanding the geological storage amount of $CO_2$. At the same time, the nanoparticle-enhanced foaming liquid slug 103 with lower viscosity and the post-$CO_2$ slug 104 are injected respectively, and the post-$CO_2$ slug 104 is injected multiple times. In the post-$CO_2$ slug 104, one part of the post-$CO_2$ is mixed with the nanoparticle-enhanced foaming liquid underground to generate the nano-armored foam in situ, which can reduce the difficulty of injection and expand the sweep range; the other part of $CO_2$ flows toward the unswept formation, which can further expand the sweep range, and then avoid the channeling of $CO_2$ due to the one-time injection of post-$CO_2$, thereby further improving the geological storage amount of $CO_2$. In the carbon dioxide geological storage method of the present disclosure, multiple slugs are injected so that respective slugs can cooperate and influence with each other, thereby significantly expanding the geological storage amount of $CO_2$.

In a specific embodiment, a ratio of an injection amount of the surfactant foam slug 102 to an injection amount of pre-$CO_2$ slug is 1:(8-10); a ratio of a total injection amount of the nanoparticle-enhanced foaming liquid slug 103 and the post-$CO_2$ slug 104 to an injection amount of the surfactant foam slug 102 is (2-4):1; a ratio of an injection amount of the post-$CO_2$ slug 104 to an injection amount of the nanoparticle-enhanced foaming liquid slug 103 is (1-4):1. In this range, the nanoparticle-enhanced foaming liquid slug 103 can be mixed with the post-$CO_2$ slug 104 to generate the nano-armored foam 201 having a higher strength; and at the same time, there may be a better coordination and collaboration between respective slugs, thereby improving the plugging effect, widening the sweep range, and expanding the geological storage amount of $CO_2$.

In a specific embodiment, when the total injection amount of the pre-$CO_2$ slug and the post-$CO_2$ slug is less than a theoretical injection amount of $CO_2$, a step 2) is performed circularly. Before injecting the pre-$CO_2$ slug 101 into the geological storage formation, it is necessary to calculate the theoretical injection amount of $CO_2$ based on the porosity, thickness and area of the geological storage formation. Specifically, the theoretical injection amount of $CO_2$ is a product of the porosity, thickness and area of the geological storage formation. However, since the injection amount of the pre-$CO_2$ slug 101 is related to the injection pressure in the actual injection process and the injection amount of the nanoparticle-enhanced foaming liquid slug 103 and the post-$CO_2$ slug 104 is related to the injection amount of the pre-$CO_2$ slug 101, in the actual injection process, there may be a situation where the total injection amount of the pre-$CO_2$ slug 101 and the post-$CO_2$ slug 104 is less than the theoretical injection amount of $CO_2$. In this case, the step 2) is performed repeatedly, thereby achieving wider sweep range and more $CO_2$ storage amount, as shown in FIG. 1.

Figure 2:
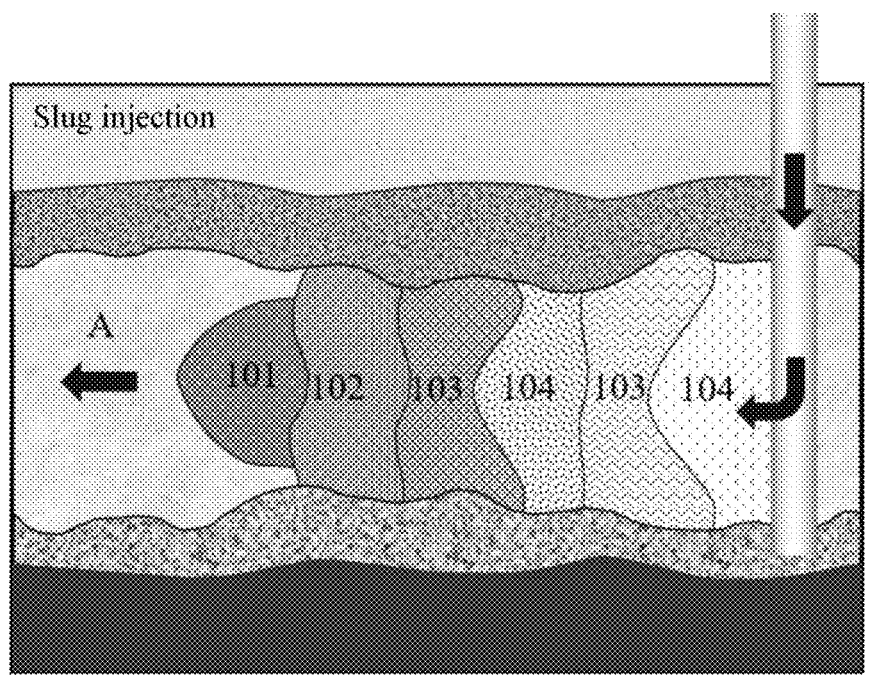
FIG. 2 is a schematic diagram of injection process of respective slugs in the process of carbon dioxide geological storage of the present disclosure.
Figure 3:
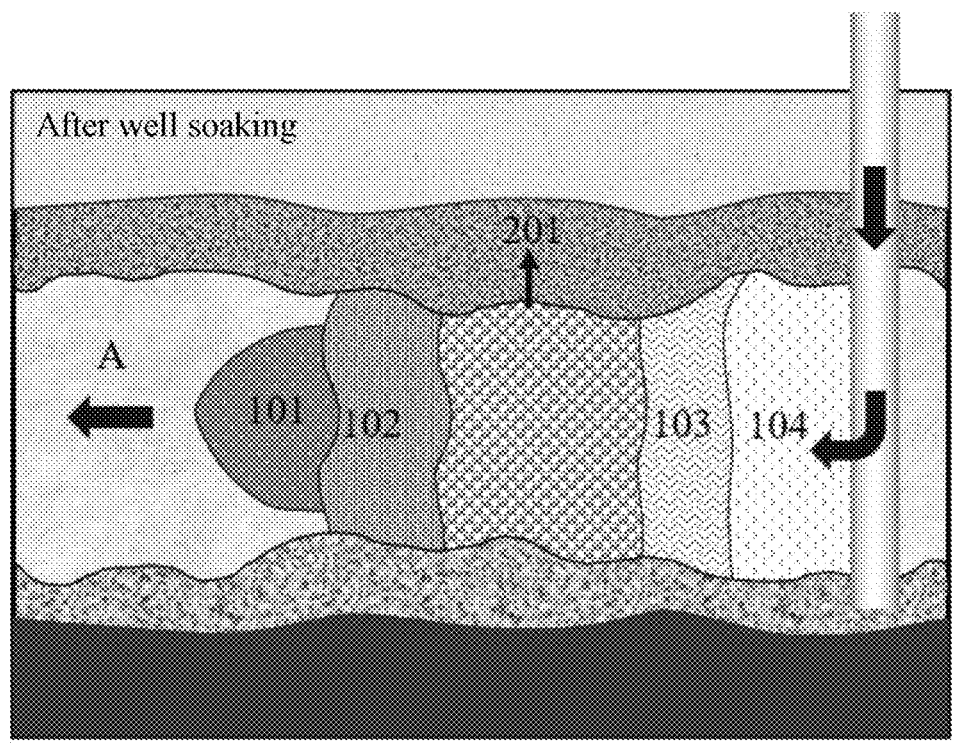
FIG. 3 is a schematic diagram of distribution and change of respective slugs after well soaking in the process of carbon dioxide geological storage of the present disclosure.

FIG. 2 is a schematic diagram of an injection process of respective slugs in the process of carbon dioxide geological storage in the present disclosure. "A" in FIG. 2 is an oil-bearing layer or a saline layer; after the pre-$CO_2$ slug 101 is injected, due to the low viscosity and density of $CO_2$, $CO_2$ will flow along a high permeability channel after injection, forming a fingering. And then, the surfactant foam slug 102 is injected with a small injection amount, which mainly plays a role of preliminary profile control and displacement, thereby avoiding the channeling of the nanoparticle-enhanced foaming liquid slug 103 injected later; and at the same time, the surfactant foam slug 102 is pre-adsorbed on the surface of formation rock, thereby avoiding the adsorption of nanoparticles, that exist in the nanoparticle-enhanced foaming liquid injected later, on the surface of formation rock. Then, the nanoparticle-enhanced foaming liquid slug 103 and the post-$CO_2$ slug 104 are injected successively, where, the post-$CO_2$ slug 104 is injected multiple times in equal portions, and a well soaking is performed after each injection. FIG. 3 is a schematic diagram of a distribution and change of respective slugs after the well soaking in the process of carbon dioxide geological storage. In FIG. 3, since a flow rate of $CO_2$ is faster than that of the nanoparticle-enhanced foaming liquid, a part of $CO_2$ is mixed with the nanoparticle-enhanced foaming liquid during the period of the well soaking, and the nano-armored foam 201 is formed in situ underground; and a part of $CO_2$ flows to the unswept formation, thereby further expanding the sweep range.

In a specific embodiment, the well soaking has a duration of 1 to 7 days. When the duration of the well soaking is within the above range, since the flow rate of $CO_2$ is faster than that of the nanoparticle-enhanced foaming liquid and the viscosity of the nanoparticle-enhanced foaming liquid is lower, the nanoparticle-enhanced foaming liquid slug 103 and the post-$CO_2$ slug 104 can have sufficient time for foaming underground so as to form the nano-armored foam with a higher strength, further improving the plugging effect, and expanding the geological storage amount of $CO_2$.

Figure 4:
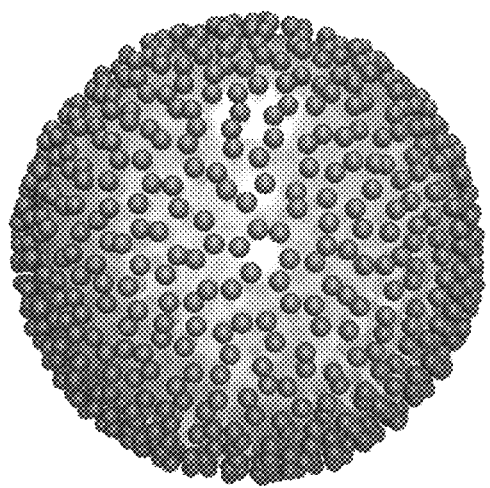
FIG. 4 is a schematic diagram of a nano-armored foam formed by zero-dimensional nanoparticles of the present disclosure.
Figure 5:
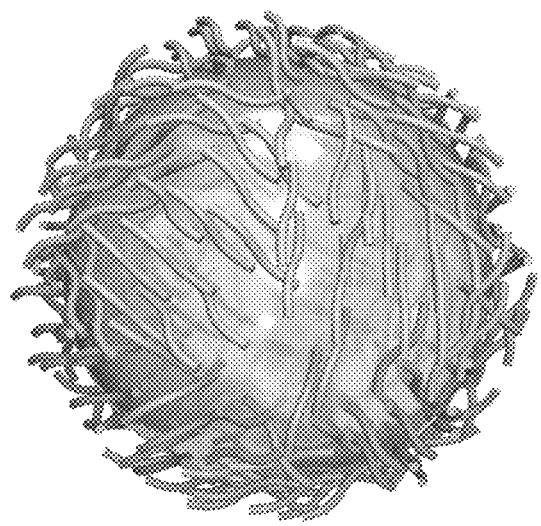
FIG. 5 is a schematic diagram of a nano-armored foam formed by one-dimensional nanoparticles of the present disclosure.
Figure 6:
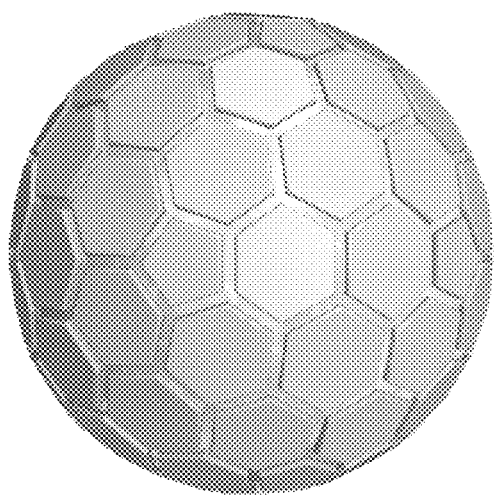
FIG. 6 is a schematic diagram of a nano-armored foam formed by two-dimensional nanoparticles of the present disclosure.
Figure 7:
FIG. 7 is a schematic diagram of the flowing of $CO_2$ in a pore throat in the process of carbon dioxide geological storage of the present disclosure.
Figure 8:
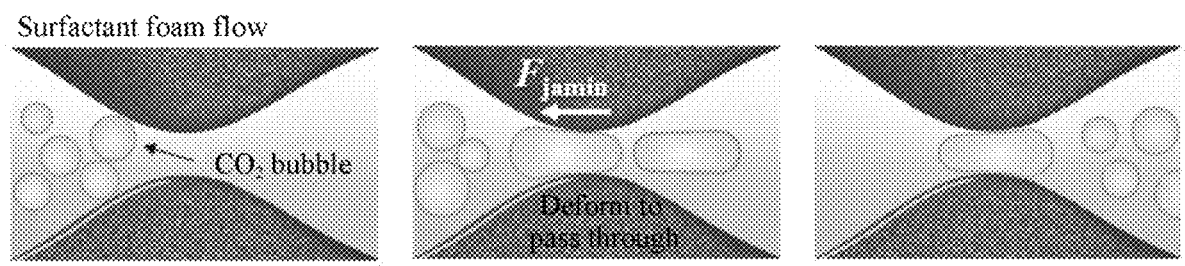
FIG. 8 is a schematic diagram of the flowing of a surfactant foam in a pore throat in the process of carbon dioxide geological storage of the present disclosure.
Figure 9:
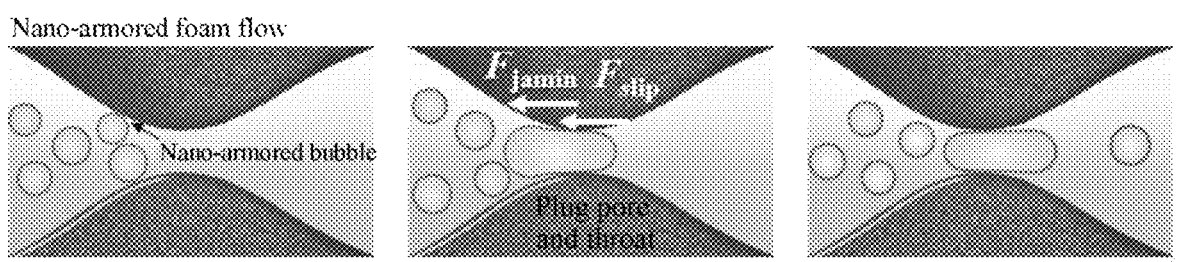
FIG. 9 is a schematic diagram of the flowing of a nano-armored foam in a pore throat in the process of carbon dioxide geological storage of the present disclosure.

In a specific embodiment, the nanoparticle includes at least one of zero-dimensional nanoparticle, one-dimensional linear nanofiber, two-dimensional sheet-like nanosheet, and three-dimensional aerogel nanomaterial. The zero-dimensional nanoparticles are mainly adsorbed in multiple layers on a bubble surface, as shown in FIG. 4. The one-dimensional linear nanofibers are mainly adsorbed convolutedly, as shown in FIG. 5. The two-dimensional sheet-like nanosheets are mainly based on monolayer adsorption and adsorbed on the gas-liquid interface to form one layer of dense nano-armored film, so as to improve the structural strength of the bubble, thereby inhibiting the agglomeration between the liquid drainage and the bubble, reducing the bubble rupture, and improving the stability of the foam, as shown in FIG. 6. In addition, compared with simple injection of $CO_2$ and surfactant foam, the formation of nano-armored film can improve the surface roughness of bubble, and generate stronger wall slippage resistance $F_{slip}$ and Jamin resistance $F_{jamin}$ when the bubble flows through the pore throat, thereby playing a good plugging effect, as shown in FIGS. 7, 8 and 9.

Specifically, different nanoparticles can be selected according to the permeability of the geological storage formation. In particular, as the permeability of the geological storage formation gradually increases, the zero-dimensional nanoparticle, the one-dimensional nanofiber, the two-dimensional nanosheet, and the three-dimensional aerogel nanoparticle can be successively used to generate single-dimensional nano-armored foam; or, a composite system of two or three of the zero-dimensional nanoparticle, the one-dimensional linear nanofiber, the two-dimensional sheet nanomaterial and the three-dimensional aerogel nanomaterial is used to generate a composite-dimensional nano-armored foam, so that the present method is suitable for the geological storage of carbon dioxide in various formations.

In the present disclosure, the zero-dimensional nanoparticle refers to a nanomaterial with three dimensions at a nanoscale, the one-dimensional linear nanofiber refers to a nanomaterial with two dimensions at a nanoscale, the two-dimensional sheet-like nanosheet refers to a nanomaterial with one dimension at a nanoscale, and the three-dimensional aerogel nanomaterial refers to a three-dimensional continuous porous material composed of a nano-pore and a nano-skeleton.

The present disclosure does not limit the specific sources of zero-dimensional nanoparticle, one-dimensional linear nanofiber, two-dimensional sheet-like nanosheet, and three-dimensional aerogel nanomaterial; and the commercially available product known to the skilled person in the art or the product prepared by a conventional preparation method can be used.

In a specific embodiment, the zero-dimensional nanoparticle includes at least one of alumina, silica, and ferroferric oxide; a wetting angle of the zero-dimensional nanoparticle to water is 103-129°; and a median particle diameter of the zero-dimensional nanoparticle is 4-30 nm. When the wetting angle of zero-dimensional nanoparticle to water and its median particle size are in the above range, the nanoparticle can be well adsorbed on the gas-liquid interface, so as to improve the densification and stability of the nano-armored foam 201, thereby improving the plugging effect and increasing the storage amount of $CO_2$.

In a specific embodiment, the one-dimensional linear nanofiber includes at least one of cellulose nanofiber, cellulose nanocrystal, and nano-chitin; and the cellulose nanofiber is preferred. Further, a section diameter of the cellulose nanofiber is 4-18 nm, and a length of the one-dimensional linear nanofiber is 10-60 μm. In this range, the cellulose nanofiber has a larger size, which is conducive to the formation of the nano-armored foam 201 with higher strength, and facilitates to improve the plugging effect of high permeability formation, thereby increasing the storage amount of $CO_2$.

In a specific embodiment, the two-dimensional sheet-like nanosheet includes at least one of inorganic Janus nanosheet and organic Janus nanosheet; and the organic Janus nanosheet is preferred. Further, a thickness of the organic Janus nanosheet is 5-40 nm and a wetting modification capacity is 60-85°. In this range, denser nano-armored foam 201 can be formed, so that the foam has higher strength and stability, thereby improving the plugging effect, achieving a higher storage amount in the process of the geological storage of carbon dioxide, and expanding the storage amount of carbon dioxide.

In the present disclosure, the wetting modification ability refers to the difference between a water contact angle after modification and a water contact angle before modification, that is, the wetting modification ability of the organic Janus nanosheet, where, a hydrophilic base is modified with the organic Janus nanosheet.

In a specific embodiment, the three-dimensional aerogel nanomaterial includes at least one of silica aerogel nanomaterial and alumina aerogel nanomaterial, preferably silica aerogel nanomaterial. Further, the silica aerogel nanoparticle has a specific surface area of 500-900 $m^2/g$, a density of 0.2-0.4 $g/cm^3$, a median particle diameter of 10-30 nm under dynamic light scattering, a porosity of 85-95%, and a wetting angle of a particle surface to water of 105-131°.

In a specific embodiment, the geological storage formation is a saline layer; a mass ratio of the second foaming agent to the nanoparticle in the nanoparticle-enhanced foaming liquid slug 103 is 3-6. When the geological storage formation is the saline layer, because the saline has a less destructive effect on the foam, even the foam with slightly lower stability can form a better plugging effect on the formation channel. Therefore, the concentration of nanoparticles in the nanoparticle-enhanced foaming liquid slug 103 can be slightly lower, and the corresponding concentration of foaming agent can be slightly higher, so as to reduce the loss of nanoparticles and reduce the cost. When the mass ratio of the second foaming agent to the nanoparticles in the nanoparticle-enhanced foaming liquid slug 103 is in the above range, which can not only form a better plugging effect, but also reduce the cost.

In a specific embodiment, the geological storage formation is an oil-bearing layer; a mass ratio of the second foaming agent to the nanoparticles in the nanoparticle-enhanced foaming liquid slug 103 is 2-4. Because the oil-bearing layer has a large destructive effect on the foam, the nano-armored foam 201 with high stability is needed to form a better plugging effect on the formation channel. Therefore, the concentration of nanoparticles in the nanoparticle-enhanced foaming liquid slug 103 may be slightly higher, and the corresponding concentration of foaming agent may be slightly lower, thereby improving the plugging effect. When the mass ratio of the second foaming agent to the nanoparticles in the nanoparticle-enhanced foaming liquid slug 103 is in the above range, a higher blocking effect can be formed, thereby expanding the geological storage amount of $CO_2$.

Finally, it should be noted that the above embodiments are only used to illustrate the technical solution of the present disclosure, and not to restrict it. Although the present disclosure is described in detail by reference to the foregoing various embodiments, persons of ordinary skill in the art should understand that it is still possible to modify the technical solution recorded in the foregoing various embodiments or to make equivalent substitutions for some or all of the technical features thereof; while, such modification or substitution shall not make the essence of the corresponding technical solutions depart from the scope of the technical solution of various embodiments of the present disclosure.

What is claimed is:

1. A method of nano-armored foam reinforced geological storage of carbon dioxide, comprising following steps:
   (1) injecting a pre-$CO_2$ slug into a geological storage formation, after an injection pressure of the pre-$CO_2$ slug shows a peak value, proceeding with an injection of the pre-$CO_2$ slug until the injection pressure is reduced to $\frac{1}{2}$-$\frac{2}{3}$ of a maximum pressure, stopping the injection of the pre-$CO_2$ slug, and then injecting a surfactant foam slug;
   (2) after completing the injection of the surfactant foam slug, successively injecting a nano-fluid foaming liquid slug and a post-$CO_2$ slug, wherein the post-$CO_2$ slug is injected multiple times in equal portions, and a well soaking is performed after completing each injection;
   wherein a ratio of each injection amount of the post-$CO_2$ slug to an injection amount of the nano-fluid foaming liquid slug is 1:(2-3);
   the surfactant foam slug comprises a gas phase and a liquid phase; the gas phase comprises $CO_2$, and the liquid phase comprises 0.1-2.0 wt % of a first foaming agent and water in balance based on a mass percentage content; a foam quality of the surfactant foam slug is 50-80%;
   the nano-fluid foaming liquid slug comprises: 0.1-2.0 wt % of a second foaming agent, 0.05-1.0 wt % of nanoparticle, 0.01-0.05 wt % of a pH regulator, 0.1-2.0 wt % of a particle solubilizer, and water in balance, based on a mass percentage content.

2. The method of nano-armored foam reinforced geological storage of carbon dioxide according to claim 1, wherein a ratio of an injection amount of the surfactant foam slug to an injection amount of the pre-$CO_2$ slug is 1:(8-10);
   a ratio of a total injection amount of the nano-fluid foaming liquid slug and the post-$CO_2$ slug to the injection amount of the surfactant foam slug is (2-4):1;
   a ratio of the injection amount of the post-$CO_2$ slug to the injection amount of the nano-fluid foaming liquid slug is (1-4):1.

3. The method of nano-armored foam reinforced geological storage of carbon dioxide according to claim 2, wherein the geological storage formation is a saline layer, and a mass ratio of the second foaming agent to the nanoparticle in the nano-fluid foaming liquid slug is 3-6; or,
   the geological storage formation is an oil-bearing layer, and a mass ratio of the second foaming agent to the nanoparticle in the—nano-fluid foaming liquid slug is 2-4.

4. The method of nano-armored foam reinforced geological storage of carbon dioxide according to claim 2, wherein when a sum of injection amounts of the pre-$CO_2$ slug and the post-$CO_2$ slug is less than a theoretical injection amount of $CO_2$, a step 2) is performed.

5. The method of nano-armored foam reinforced geological storage of carbon dioxide according to claim 4, wherein the geological storage formation is a saline layer, and a mass ratio of the second foaming agent to the nanoparticle in the nano-fluid foaming liquid slug is 3-6; or,
   the geological storage formation is an oil-bearing layer, and a mass ratio of the second foaming agent to the nanoparticle in the nano-fluid foaming liquid slug is 2-4.

6. The method of nano-armored foam reinforced geological storage of carbon dioxide according to claim 1, wherein the well soaking has a duration of 1 to 7 days.

7. The method of nano-armored foam reinforced geological storage of carbon dioxide according to claim 6, wherein the geological storage formation is a saline layer, and a mass ratio of the second foaming agent to the nanoparticle in the nano-fluid foaming liquid slug is 3-6; or,
   the geological storage formation is an oil-bearing layer, and a mass ratio of the second foaming agent to the nanoparticle in the nano-fluid foaming liquid slug is 2-4.

8. The method of nano-armored foam reinforced geological storage of carbon dioxide according to claim 6, wherein the nanoparticle comprises at least one of a zero-dimensional nanoparticle, a one-dimensional linear nanofiber, a two-dimensional sheet-like nanosheet, and a three-dimensional aerogel nanomaterial.

9. The method of nano-armored foam reinforced geological storage of carbon dioxide according to claim 8, wherein the zero-dimensional nanoparticle comprises at least one of alumina, silica and ferroferric oxide;
   a wetting angle of the zero-dimensional nanoparticle to water is 103-129°, and a median particle diameter of the zero-dimensional nanoparticle is 4-30 nm.

10. The method of nano-armored foam reinforced geological storage of carbon dioxide according to claim 8, wherein the one-dimensional linear nanofiber comprises at least one of cellulose nanofiber, cellulose nanocrystal, and nano-chitin;
   a section diameter of the cellulose nanofiber is 4-18 nm, and a length of the one-dimensional linear nanofiber is 10-60 pm.

11. The method of nano-armored foam reinforced geological storage of carbon dioxide according to claim 8, wherein the two-dimensional sheet-like nanosheet comprises at least one of inorganic Janus nanosheet and organic Janus nanosheet;
   the organic Janus nanosheet has a thickness of 5-40 nm and a wetting modification capacity is 60-85°.

12. The method of nano-armored foam reinforced geological storage of carbon dioxide according to claim 8, wherein the three-dimensional aerogel nanomaterial comprises at least one of silica aerogel nanomaterial and alumina aerogel nanomaterial;
   the silica aerogel nanoparticle has a specific surface area of 500-900 m2/g, a density of 0.2-0.4 g/cm3, a median particle diameter of 10-30 nm, a porosity of 85-95%, and a wetting angle of a particle surface to water of 105-131°.

13. The method of nano-armored foam reinforced geological storage of carbon dioxide according to claim 8, wherein the geological storage formation is a saline layer, and a mass ratio of the second foaming agent to the nanoparticle in the nano-fluid foaming liquid slug is 3-6; or,
   the geological storage formation is an oil-bearing layer, and a mass ratio of the second foaming agent to the nanoparticle in the nano-fluid foaming liquid slug is 2-4.

14. The method of nano-armored foam reinforced geological storage of carbon dioxide according to claim 1, wherein the nanoparticle comprises at least one of a zero-dimensional nanoparticle, a one-dimensional linear nanofiber, a two-dimensional sheet-like nanosheet, and a three-dimensional aerogel nanomaterial.

15. The method of nano-armored foam reinforced geological storage of carbon dioxide according to claim 14, wherein the zero-dimensional nanoparticle comprises at least one of alumina, silica and ferroferric oxide;
   a wetting angle of the zero-dimensional nanoparticle to water is 103-129°, and a median particle diameter of the zero-dimensional nanoparticle is 4-30 nm.

16. The method of nano-armored foam reinforced geological storage of carbon dioxide according to claim 14, wherein the one-dimensional linear nanofiber comprises at least one of cellulose nanofiber, cellulose nanocrystal, and nano-chitin;
   a section diameter of the cellulose nanofiber is 4-18 nm, and a length of the one-dimensional linear nanofiber is 10-60 pm.

17. The method of nano-armored foam reinforced geological storage of carbon dioxide according to claim 14, wherein the two-dimensional sheet-like nanosheet comprises at least one of inorganic Janus nanosheet and organic Janus nanosheet;
   the organic Janus nanosheet has a thickness of 5-40 nm and a wetting modification capacity is 60-85°.

18. The method of nano-armored foam reinforced geological storage of carbon dioxide according to claim 14, wherein the three-dimensional aerogel nanomaterial comprises at least one of silica aerogel nanomaterial and alumina aerogel nanomaterial;
   the silica aerogel nanoparticle has a specific surface area of 500-900 $m^2$/g, a density of 0.2-0.4 $g/cm^3$, a median particle diameter of 10-30 nm, a porosity of 85-95%, and a wetting angle of a particle surface to water of 105-131°.

19. The method of nano-armored foam reinforced geological storage of carbon dioxide according to claim 14, wherein the geological storage formation is a saline layer, and a mass ratio of the second foaming agent to the nanoparticle in the nano-fluid foaming liquid slug is 3-6; or,
   the geological storage formation is an oil-bearing layer, and a mass ratio of the second foaming agent to the nanoparticle in the nano-fluid foaming liquid slug is 2-4.

20. The method of nano-armored foam reinforced geological storage of carbon dioxide according to claim 1, wherein the geological storage formation is a saline layer, and a mass ratio of the second foaming agent to the nanoparticle in the—nano-fluid foaming liquid slug is 3-6; or,
   the geological storage formation is an oil-bearing layer, and a mass ratio of the second foaming agent to the nanoparticle in the nano-fluid foaming liquid slug is 2-4.

* * * * *